United States Patent
Wilkinson et al.

(10) Patent No.: US 6,673,480 B1
(45) Date of Patent: Jan. 6, 2004

(54) SENSOR CELL FOR AN ELECTROCHEMICAL FUEL CELL STACK

(75) Inventors: David P. Wilkinson, North Vancouver (CA); Shanna D. Knights, Burnaby (CA); Michael V. Lauritzen, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/719,829

(22) PCT Filed: Jul. 2, 1999

(86) PCT No.: PCT/CA99/00611
§ 371 (c)(1),
(2), (4) Date: Feb. 23, 2001

(87) PCT Pub. No.: WO00/02282
PCT Pub. Date: Jan. 13, 2000

Related U.S. Application Data

(60) Provisional application No. 60/091,531, filed on Jul. 2, 1998.

(51) Int. Cl.$^7$ ................................................ H01M 8/04
(52) U.S. Cl. ............................. 429/13; 429/23; 429/24
(58) Field of Search .............................. 429/13, 22, 23, 429/24

(56) References Cited

U.S. PATENT DOCUMENTS

| | | | |
|---|---|---|---|
| 4,904,548 A | 2/1990 | Tajima | 429/22 |
| 5,170,124 A | 12/1992 | Blair et al. | 324/434 |
| 5,260,143 A * | 11/1993 | Voss et al. | 429/13 |
| 5,478,662 A | 12/1995 | Strasser | 429/13 |
| 5,607,784 A * | 3/1997 | Jalan et al. | 429/16 |
| 5,763,113 A | 6/1998 | Meltser et al. | 429/13 |
| 5,798,186 A * | 8/1998 | Fletcher et al. | 429/13 |
| 5,945,229 A * | 8/1999 | Meltser | 429/13 |
| 6,492,043 B1 * | 12/2002 | Knights et al. | 429/13 |

FOREIGN PATENT DOCUMENTS

| | | |
|---|---|---|
| EP | 0 862 233 | 9/1998 |
| EP | 0 827 226 | 3/2000 |
| JP | 60-54176 | 3/1985 |
| JP | 6-260195 | 9/1994 |

* cited by examiner

*Primary Examiner*—Randy Gulakowski
*Assistant Examiner*—Jonathan Crepeau
(74) *Attorney, Agent, or Firm*—McAndrews, Held & Malloy, Ltd.

(57) ABSTRACT

An electrochemical fuel cell stack includes a plurality of fuel cells. At least one of the fuel cells is a sensor cell. The sensor cell has at least one structural dissimilarity with respect to the remaining fuel cells of the plurality. The structural dissimilarity may include, for example, a reduced sensor cell electrochemically active area, reduced electrocatalyst loading, modified anode or cathode flow field, different electrocatalyst composition, or a modified coolant flow field configuration. The sensor cell operates under substantially the same conditions as the remaining cells in the stack. However, in response to a change in a particular stack operating condition, an electrical or thermal response, preferably a voltage change, is induced in the sensor cell which is not simultaneously induced in the remaining fuel cells. Thus, the sensor cell can detect undesirable conditions and its response can be used to initiate corrective action. More than one sensor cell, specific to different types of conditions, may be employed in the stack. In the absence of undesirable conditions, the sensor cell can function as a power-producing fuel cell.

39 Claims, 13 Drawing Sheets

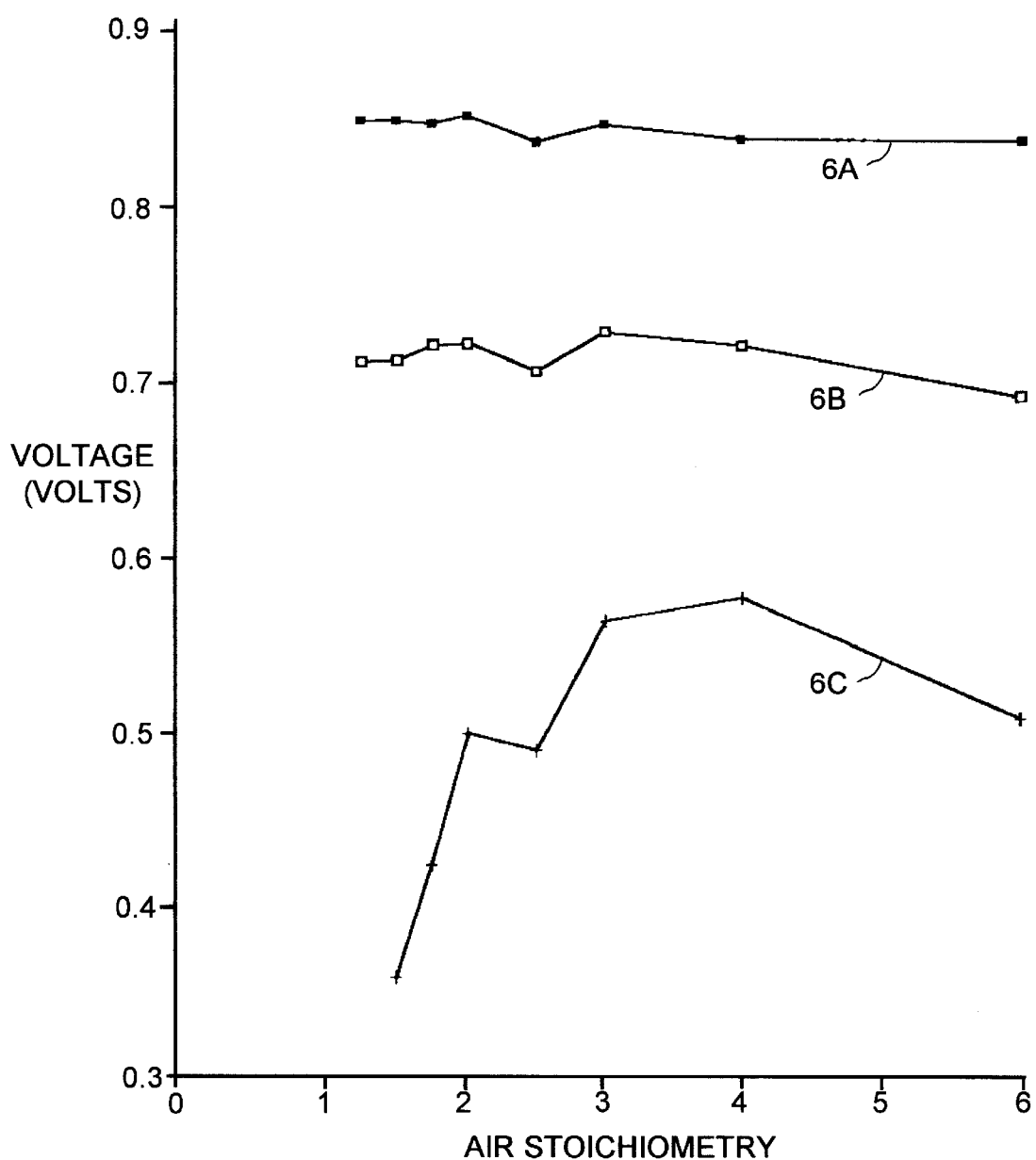

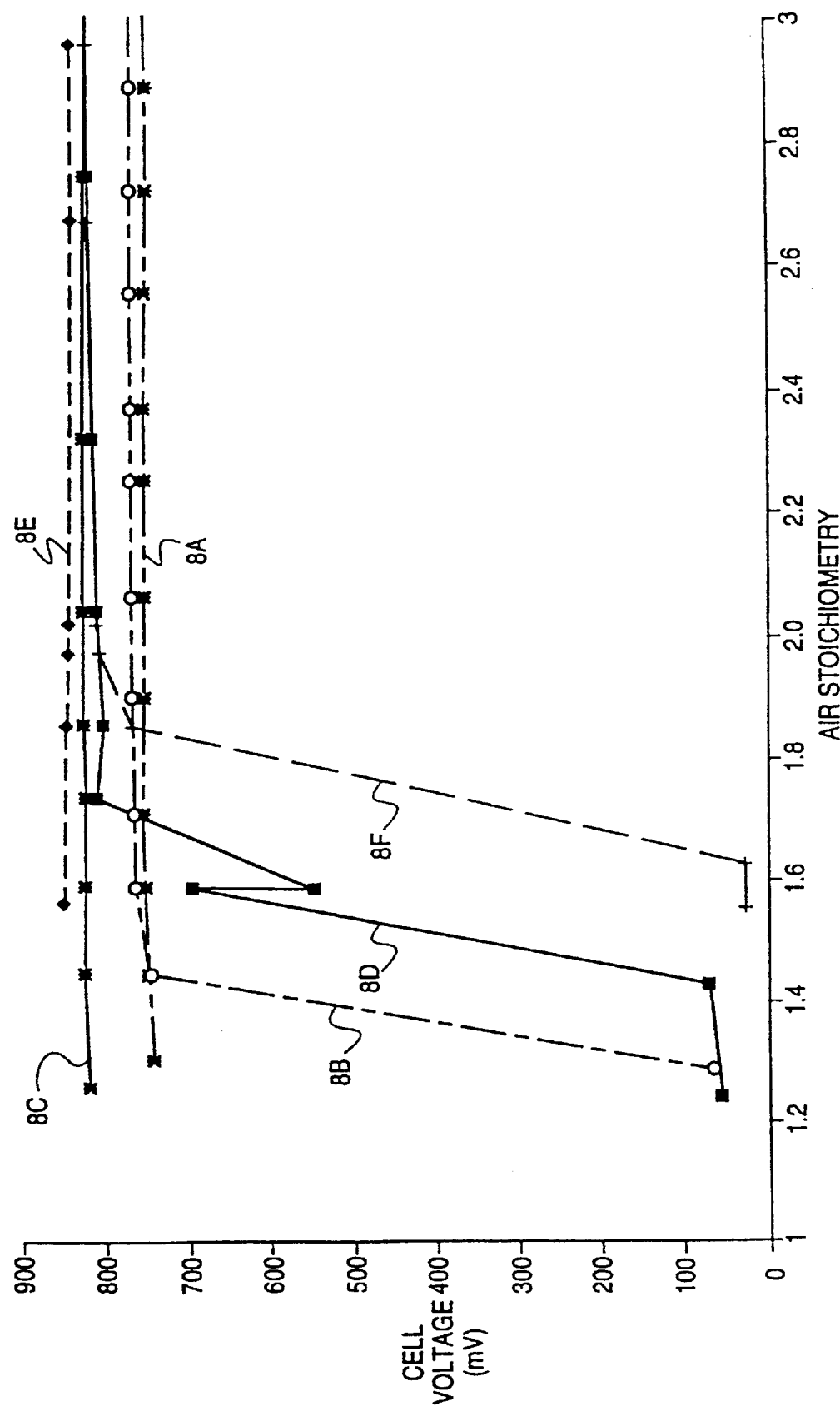

SENSOR CELL FOR AN ELECTROCHEMICAL FUEL CELL STACK

This application claims benefit of provisional application 60/091,531 filed Jul. 2, 1998

FIELD OF THE INVENTION

The present invention relates to electrochemical fuel cells, and more particularly to the incorporation into a fuel cell stack of one or more specialized sensor fuel cells for detecting problematic conditions before the other cells in the stack are adversely affected by those conditions.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit.

At the anode, the fuel stream moves through the porous anode substrate and is oxidized at the anode electrocatalyst layer. At the cathode, the oxidant stream moves through the porous cathode substrate and is reduced at the cathode electrocatalyst layer to form a reaction product.

In fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

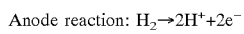

Anode reaction: $H_2 \rightarrow 2H^+ + 2e^-$

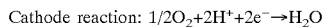

Cathode reaction: $1/2 O_2 + 2H^+ + 2e^- \rightarrow H_2O$

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to or across the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell. Separator plates typically do not have flow passages formed in the surfaces thereof, but are used in combination with an adjacent layer of material which provides access passages for the fuel and oxidant to the respective anode and cathode electrocatalyst, and provides passages for the removal of reaction products.

Two or more fuel cells can be electrically connected together in series to increase the overall power output of the assembly. In series arrangements, one side of a given fluid flow field or separator plate can serve as an anode plate for one cell and the other side of the fluid flow field or separator plate can serve as the cathode plate for the adjacent cell. Such a multiple fuel cell arrangement is referred to as a fuel cell stack, and is usually held together in its assembled state by tie rods and end plates, with the series of fuel cell assemblies interposed between the pair of end plates. The stack typically includes inlet ports and manifolds for directing the fluid fuel stream (such as substantially pure hydrogen, methanol reformate or natural gas reformate, or a methanol-containing stream in a direct methanol fuel cell) and the fluid oxidant stream (such as substantially pure oxygen, oxygen-containing air or oxygen in a carrier gas such as nitrogen) to the individual fuel cell reactant flow passages. The stack also commonly includes an inlet port and manifold for directing a coolant fluid stream, typically water, to interior passages within the stack to absorb heat generated by the fuel cell during operation. The stack also generally includes exhaust manifolds and outlet ports for expelling the depleted reactant streams, and the reaction products such as water, as well as an exhaust manifold and outlet port for the coolant stream exiting the stack. In a power generation system various fuel, oxidant and coolant conduits carry these fluid streams to and from the fuel cell stack.

Typically, fuel cell stack performance is monitored by detecting the voltage of individual cells or groups of cells in the stack. A typical stack generally comprises 30 to 200 individual cells. Voltage detection of individual cells or groups of cells is expensive and requires a complex data acquisition system and control algorithm to detect and identify a voltage condition outside a preset voltage range and to take corrective action or shut down the stack until normal operating conditions (i.e. conditions within a desired or preferable range) can be restored. A typical approach to monitoring fuel cell performance using voltage detection is described in U.S. Pat. No. 5,170,124. The '124 patent describes an apparatus and method for measuring and comparing the voltages of groups of cells in a fuel cell stack to a reference voltage. If the measured and reference voltages differ by more than a predetermined amount, an alarm signal or process control procedures can be initiated to implement a shut-down sequence or commence remedial action. While this voltage detection approach identifies the existence of an out-of-bounds condition, the approach is imprecise as to the source and/or nature of the problem which triggered the out-of-bounds condition.

SUMMARY OF THE INVENTION

In an electrochemical fuel cell stack comprising a plurality of fuel cells, each of the fuel cells comprises an anode comprising an anode electrocatalyst, a cathode comprising a cathode electrocatalyst, and an ion exchange membrane interposed between the anode and the cathode. At least one of the plurality of fuel cells is a sensor cell which has at least one structural dissimilarity with respect to the remaining fuel cells of the plurality. During operation of the stack, the structural dissimilarity induces an electrical and/or thermal response in the sensor cell which is not simultaneously induced in the remaining fuel cells under substantially the same operating conditions.

Thus, the sensor cell preferably operates under substantially the same conditions as the remaining non-sensor cells. However, in response to a change in a particular conditions an electrical and/or thermal response (preferably a voltage change) is induced in the sensor cell which is not simultaneously induced in the remaining fuel cells. The sensor cell reacts differently to, and can therefore be used to detect, undesirable conditions before they adversely affect other cells in the stack. The different electrical and/or thermal response of the sensor cell to the particular operating condition may provide diagnostic information, or a warning signal, or may be used to initiate a specific correction sequence to restore the stack to normal operating conditions or to shut down the stack if normal conditions cannot be restored. More than one type of sensor cell, specific to different types of conditions, may be employed in a fuel cell stack.

During operation of a fuel cell stack the anodes have a fuel stream directed thereto, typically via anode flow fields, the cathodes have an oxidant stream directed thereto typically via cathode flow fields, and each of the fuel stream and the oxidant stream directed to the fuel cells of the stack have an inlet pressure and a stoichiometry associated therewith. Each of the plurality of fuel cells generate an electric current per cathode unit area, product water at the cathode and heat at a nominal operating temperature. Preferably, the structural dissimilarity induces an electrical and/or thermal response in the sensor cell which is not simultaneously induced in the remaining fuel cells under substantially the same operating conditions of reactant supply, for example, cell inlet reactant pressure and stoichiometry. Preferably, the plurality of fuel cells are manifolded to be supplied with reactants in a parallel supply configuration. This arrangement generally makes it easier to ensure that the cells are operating under substantially the same conditions with respect to reactant supply.

Sensor cells incorporated in a stack can also serve as useful power-producing cells. Thus, during operation of the stack to produce electrical power the sensor cell(s) and the remaining cells are connected to provide electrical power. A variable electrical load may be applied across the fuel cell stack comprising the sensor cell(s).

In the above embodiments, it is preferably a voltage change which is induced in the sensor cell but not simultaneously induced in the remaining fuel cells, in response to a change in a particular stack operating condition. Typically the sensor cell is designed so that its voltage will drop before, or more rapidly than, the voltage of other cells in the stack in response to an undesirable operating condition.

Other responses which may be induced in the sensor cell but not simultaneously induced in the remaining fuel cells, in response to a change in a particular stack operating condition, include changes in electric current per cathode unit area (current density) in the sensor cell; changes in the voltage distribution within a component of the sensor cell; changes in electrical resistance in the sensor cell; and/or temperature changes in the sensor cell.

The voltage (or other characteristic) of the sensor cell may or may not be substantially the same as the remaining cells during normal operating conditions, but it is the difference in, its reaction to a change in conditions which is important to its function as a sensor cell.

Various structural dissimilarities may be incorporated in the sensor cell to provide it with enhanced sensitivity to particular stack operating conditions. For example, in preferred embodiments, at least one of the anode and the cathode in the sensor cell may have an electrochemically active area less than the electrochemically active area of the remaining fuel cells. Reactant access to at least one of the anode and cathode electrocatalysts in the sensor cell may be impeded relative to in the remaining fuel cells, for example, by blocking or eliminating some of the reactant access passages or channels in the porous electrodes, or in the flow field plates, or by masking certain areas of the cell. The electrocatalyst loading in at least one of the anode and the cathode of the sensor cell may be less than the electrocatalyst loading in the remaining fuel cells. In general, a decrease in the electrochemically active area and/or a decrease in the electrocatalyst loading would increase the performance sensitivity of the sensor cell to various undesirable fuel cell operating conditions. However, such an approach alone may not be sufficient if the sensor cell is to differentiate between different conditions that affect performance.

In other preferred embodiments, the sensor cell reactant flow field configuration may differ from the reactant flow field configuration of the remaining fuel cells. For example, the sensor cell reactant flow field configuration may induce a pressure drop which is greater than the pressure drop induced in the reactant flow field configuration of the remaining fuel cells. The sensor cell may comprise an anode or cathode electrocatalyst which differs in composition from the corresponding anode or cathode electrocatalyst in the remaining fuel cells. In stacks in which each of the fuel cells has a coolant stream directed along a coolant flow field in thermal communication with the each of the fuel cells, the sensor cell coolant flow field configuration may differ from the coolant flow field configuration of the remaining fuel cells.

The structural dissimilarity is selected to render the sensor cell more sensitive to changes in one or more particular stack operating conditions, for example, fuel stoichiometry, oxidant stoichiometry, carbon monoxide poisoning of the anode electrocatalyst, air bleed level in the fuel stream, fuel cell operating temperature, methanol poisoning, flooding of an electrode, dehydration and/or mass transport issues. In a direct methanol fuel cell stack, it may be useful to incorporate a sensor cell wherein the structural dissimilarity renders the sensor cell more sensitive to methanol concentration. In some embodiments the condition is exacerbated in the sensor cell so it reacts earlier, whereas in other embodiments the sensor cell is merely more sensitive to the condition.

Thus in preferred embodiments, sensor cells are more sensitive to at least one particular type of undesirable fuel cell operating condition (compared to other cells in the stack) such as:

low reactant stoichiometry;
excessive reactant stoichiometry;
flooding;
low or excessive fuel cell operating temperature;
carbon monoxide poisoning or other types of poisoning of the electrocatalyst;
reactant dilution, such as by a build-up of inert species like nitrogen in the reactant stream;
dehydration.

Sensor cells are affected by one or more of the above, or other, undesirable conditions in advance of the other cells. They may be used to prevent such undesirable conditions from causing general stack underperformance or damage by detecting the need for, and preferably triggering, corrective action. The early detection of undesirable or potentially deleterious operating conditions is particularly important in larger stacks employing many individual fuel cells because of increasing demands for stack reliability and longer stack lifetime. The incorporation of one or more sensor cells generally reduces the cost of and simplifies the stack control system, and also improves stack safety and reliability.

A method of operating an electrochemical fuel cell system comprising a fuel cell stack and a sensor cell, as described in any of the above embodiments, comprises:

monitoring at least one of an electrical and thermal operating parameter of the sensor cell and the same parameter of at least one of the remaining cells;

comparing the monitored operating parameter of the sensor cell with that of the at least one remaining cell;

generating an output signal if the compared parameters differ by more than a predetermined threshold amount indicative of an undesirable operating condition.

Preferred parameters to monitor are cell voltage or temperature, although many other parameters may be used as described above. The parameters which are measured and compared may be, for example, actual measured voltage values, or the rate of change of voltage which occurs in the sensor cell versus the at least one other cell in response to a change in operating conditions.

The output signal can have a number of effects including, for example, issuing a warning signal to alert the operator of the system to the presence of an undesirable operating condition, initiating recording of data, or triggering a corrective action to restore desirable operating conditions in the fuel cell system, by interfacing with the control system.

The monitoring of the selected parameter or parameters may, for example, be done continuously or periodically during operation of the stack.

BRIEF DESCRIPTION OF THE DRAWINGS

FIG. 6a is a composite plot showing cell voltage as a function of oxidant (air) stoichiometry of a fuel cell at three different current densities, namely, 100 amperes per square foot (ASF), 500 ASF and 1000 ASF.

FIG. 8 is a composite plot showing cell voltage as a function of oxidant (air) stoichiometry at 100 amperes per square foot (ASF), at three different oxidant stream pressures, in a sensor cell (cell 8) and in the average of the other seven cells of the stack.

DETAILED DESCRIPTION OF PREFERRED EMBODIMENTS

Figure 1:
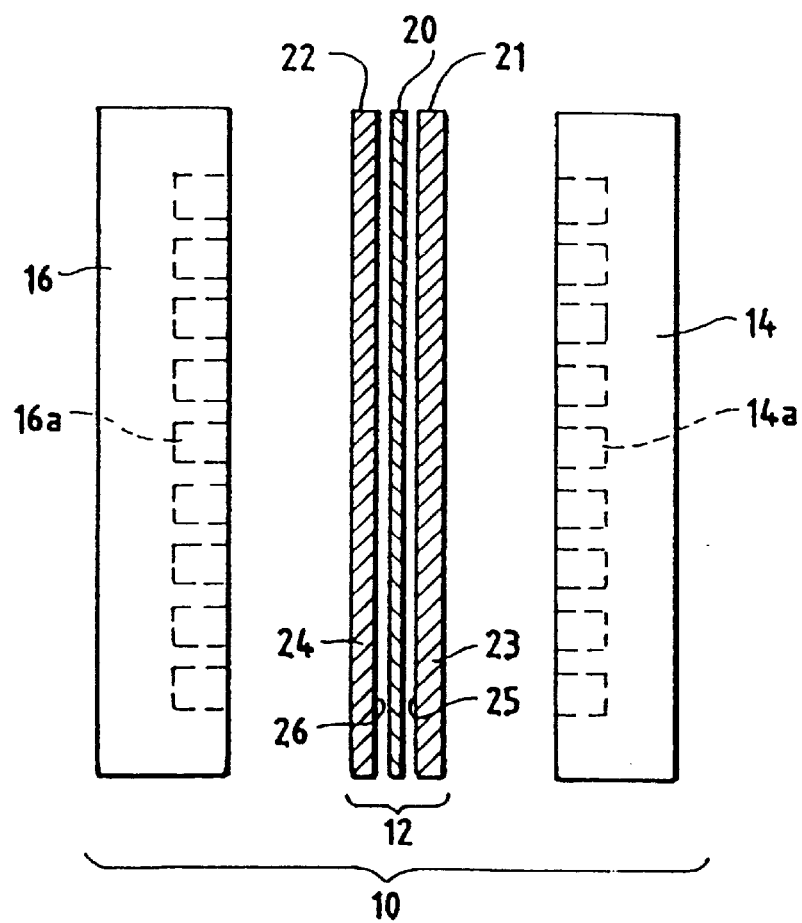
FIG. 1 is an exploded side view of a typical solid polymer electrochemical fuel cell with a membrane electrode assembly interposed between two fluid flow field plates.

FIG. 1 illustrates a typical fuel cell 10. Fuel cell 10 includes a membrane electrode assembly 12 interposed between anode flow field plate 14 and cathode flow field plate 16. Membrane electrode assembly 12 consists of an ion exchange membrane 20 interposed between two electrodes, namely, anode 21 and cathode 22. In conventional fuel cells, anode 21 and cathode 22 comprise a substrate of porous electrically conductive sheet material 23 and 24, respectively, for example, carbon fiber paper or carbon cloth. Each substrate has a thin layer of electrocatalyst 25 and 26, respectively, disposed on one surface thereof at the interface with membrane 20 to render each electrode electrochemically active.

As further shown in FIG. 1, anode flow field plate 14 has at least one fuel flow channel 14a engraved, milled or molded in its surface facing anode 21. Similarly, cathode separator plate 16 has at least one oxidant flow channel 16a engraved, milled or molded in its surface facing cathode 22. When assembled against the cooperating surfaces of electrodes 21 and 22, channels 14a and 16a form the reactant flow field passages for the fuel and oxidant, respectively. The flow field plates are electrically conductive.

Figure 2:
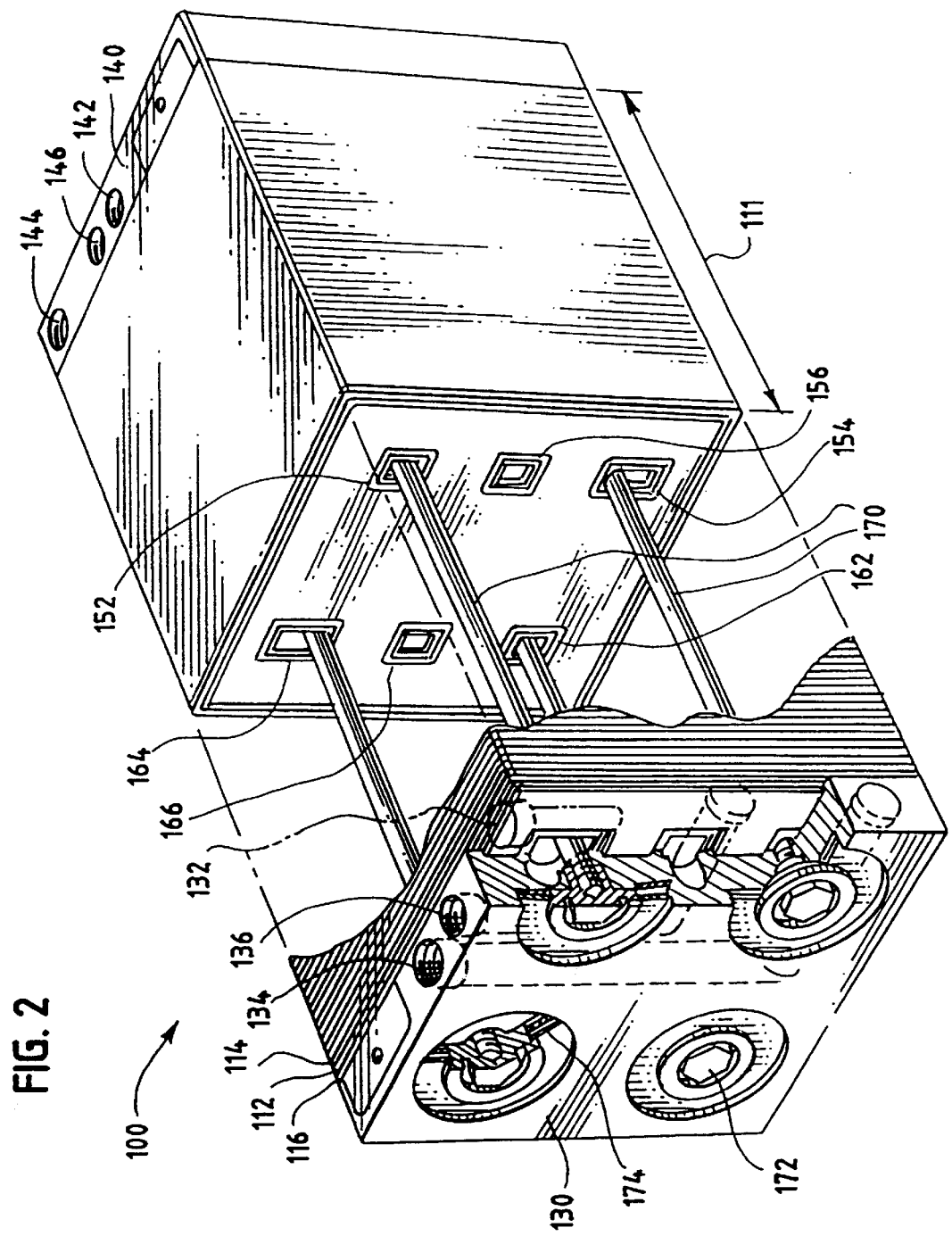
FIG. 2 is a perspective cut-away view of an exemplary electrochemical fuel cell stack.

Turning now to FIG. 2, a fuel cell stack 100 includes a plurality of fuel cell assemblies, a series of which is designated as 111 in FIG. 2. Each of the fuel cell assemblies includes a membrane electrode assembly 112 interposed between a pair of fluid flow field plates 114, 116. Fuel cell stack 100 also includes a first end plate 130 and a second end plate 140.

Plate 130 includes fluid inlet ports 132, 134, 136 for introducing fluid fuel, oxidant and coolant streams, respectively, to the stack. Plate 140 includes fluid outlet ports 142, 144, 146 for exhausting fluid fuel, oxidant and coolant streams, respectively, from the stack. The fluid outlet ports are fluidly connected to the corresponding fluid inlet ports via passages within stack 100.

The fuel cell assemblies have a series of openings formed therein, which cooperate with corresponding openings in adjacent assemblies to form fluid manifolds 152, 154, 156, 162, 164, 166 within stack 100. A fuel stream entering the stack via fuel inlet port 132 is directed to the individual fuel flow field plates via manifold 152. After passing through the fuel flow field plate channels, the fuel stream is collected in manifold 162 and exhausted from the stack via fuel outlet port 142. Similarly, an oxidant stream entering the stack via oxidant inlet port 134 is directed to individual oxidant flow field plates via manifold 154. After passing through the oxidant flow field plate channels, the oxidant stream is collected in manifold 164 and exhausted from the stack via oxidant outlet port 144. A fluid coolant (typically water) introduced via coolant inlet port 136 is directed to coolant plate assemblies (not shown) in stack 100 via manifold 156. The coolant stream is collected in manifold 166 and exhausted from the stack via coolant outlet port 146.

Tie rods 170 extend between end plates 130 and 140 to compress and secure stack 100 in its assembled state with fastening nuts 172 disposed at opposite ends of each tie rod, and disc springs 174 interposed between fastening nuts 172 and end plates 130, 140.

Figure 3:
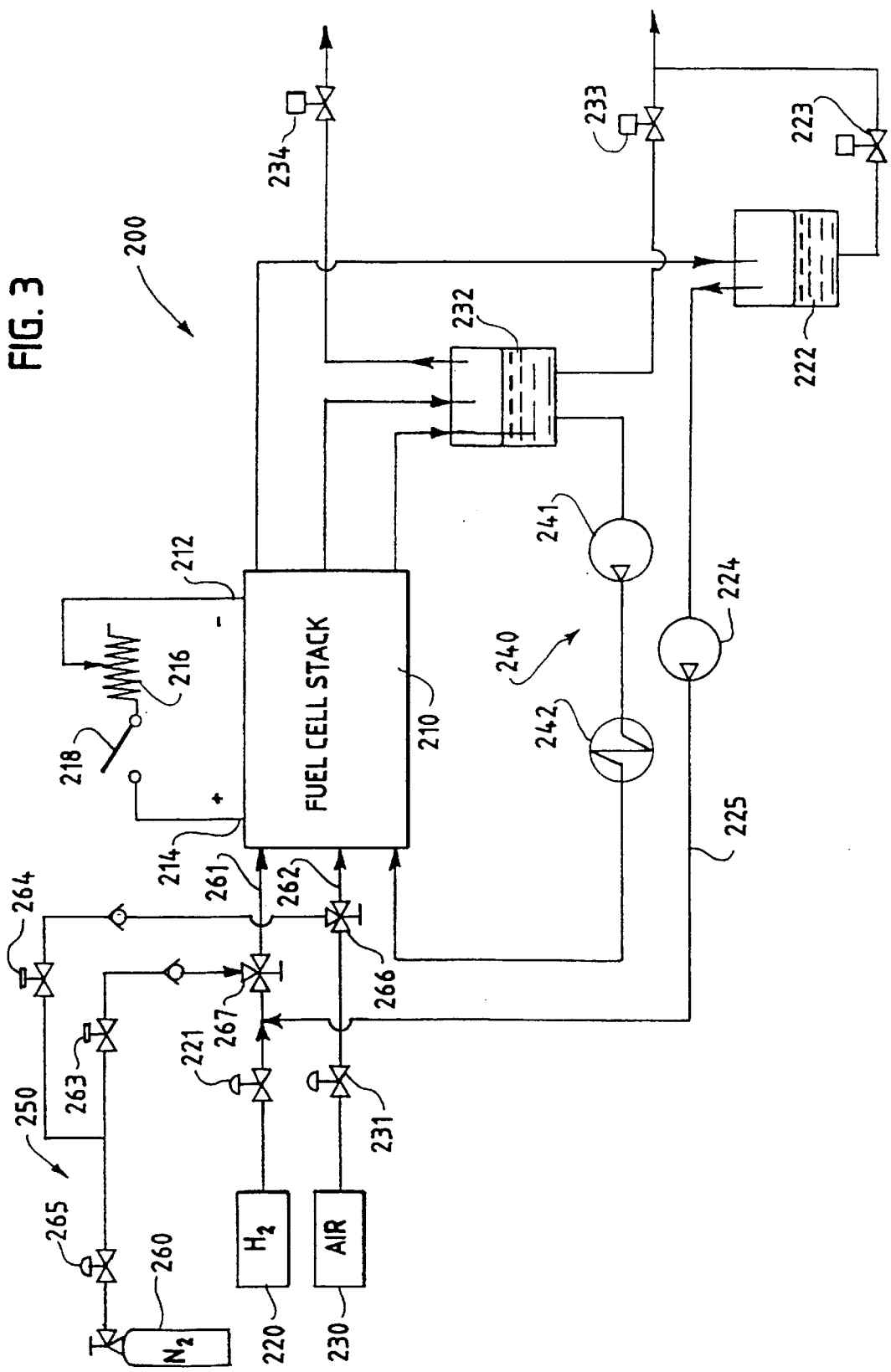
FIG. 3 is a schematic diagram of a fuel cell electric power generation system.

FIG. 3 is a schematic diagram of a fuel cell electric power generation system 200 comprising a fuel cell stack 210. Fuel cell stack 210 includes negative and positive bus plates 212, 214, respectively, to which an external circuit comprising a variable load 216 is electrically connectable by closing switch 218. The system includes a fuel (hydrogen) circuit, an oxidant (air) circuit, and a coolant water circuit. The reactant and coolant streams are circulated in the system in various conduits illustrated schematically in FIG. 3.

A hydrogen supply 220 is connected to the stack 210, and the supply pressure is controlled by pressure regulator 221. Water in the hydrogen stream exiting stack 210 is accumulated in a knockout drum 222, which can be drained by opening valve 223. Unreacted hydrogen is recirculated to stack 210 by a pump 224 in recirculation loop 225.

An air supply 230 is connected to stack 210, the pressure of which is controlled by pressure regulator 231. Water in the air stream exiting the stack 210 is accumulated in reservoir 232, which can be drained by opening valve 233, and the air stream is vented from the system via valve 234.

In the coolant water loop 240, water is pumped from reservoir 232 and circulated through stack 210 by pump 241. The temperature of the water is adjusted in a heat exchanger 242.

A purge system 250 is used to purge the hydrogen and oxidant passages in fuel cell stack 210 with low humidity, non-reactive gas. Flow of gas (e.g., dry nitrogen) from a purge gas supply 260 to the hydrogen and air inlet conduits 261, 262 is controlled by valves 263, 264 and three-way valves 267, 266. The nitrogen pressure is controlled by pressure regulator 265.

In one embodiment, sensor cells have more performance sensitivity to low reactant stoichiometries than the remaining cells in the stack. "Stoichiometry" is the ratio of the amount of reactant supplied to the fuel cell stack to the amount of reactant actually consumed in the fuel cell stack (unconsumed reactants exit the fuel cell stack). A hydrogen ($H_2$) stoichiometry of 1.35 means that 135 parts of hydrogen are supplied to the fuel cell stack for each 100 parts actually consumed in the fuel cell stack. In connection with reactant stoichiometry, it is generally important to avoid insufficient reactant stoichiometry or causing reactant starvation in the fuel cells of the stack. Reactant starvation may cause cells to assume low voltages and, if corrective action is not taken, cells may be driven into cell voltage reversal. Cell voltage reversal and associated effects such as material degradation and overheating can result in damage to fuel cell components, particularly the membrane electrode assembly. In the case of fuel starvation, for example, large positive potentials may be reached on the anode that can lead to negative overall cell voltages, and in some cases is to oxidation of fuel cell components and associated permanent damage to the fuel cells. Early detection of undesirable low reactant stoichiometry conditions may be accomplished by the incorporation into a stack of at least one sensor cell that assumes a low voltage or overheats in advance of the other fuel cells in the stack. The sensor cell(s) may be coupled to the stack operating control system to initiate a corrective action to avoid the detrimental effects of insufficient reactant stoichiometry on the remaining cells.

Stoichiometry sensitivity in a sensor cell can be achieved, for example, by modifying the pressure drop in the flow field channels of the sensor cell, for example, by changing the depth of the channel while maintaining the length and open area of the channel the same as those channel dimensions in the other fuel cells in the stack which are not sensor cells. Such sensitivity can also be achieved, for example, by modifying the length, width, surface friction factor, and/or the number of channels. Further, stoichiometry sensitivity can also be achieved by modifying the mass transport properties of the membrane electrode assembly (MEA) of the sensor cell(s) relative to other cells in the stack. Some specific MEA modification techniques include: adding an ionomer coating to the porous electrode substrate; increasing the ionomer content of the electrocatalyst layer in an electrode; changing the water management properties by changing the hydrophobicity of the cathode; and increasing the thickness and/or decreasing the porosity of a sublayer, if one is employed (a sublayer being a layer in an electrode located between the electrocatalyst layer and an underlying substrate). Any of these techniques may be applied in a localized, differential or graded manner in the MEA.

Preferably, sensor cells in which the effect of low stoichiometry is deliberately exacerbated are designed to be more tolerant or robust to the consequences thereof, for example, cell voltage reversal. For example, in a fuel stoichiometry sensitive sensor cell the anode catalyst may be a platinum black which tends to be more tolerant of cell voltage reversal than a carbon-supported platinum catalyst which may be used in the other cells.

In the case where sensitivity is achieved by modifying the pressure drop, according to Darcy's formula (see U.S. Pat. No. 5,260,143), the pressure drop between the inlet and the outlet of a gas stream in a fuel cell fluid flow field increases with increasing fluid density, friction factor, flow passage length and fluid velocity. Conversely, the pressure drop between the inlet and the outlet of a gas stream decreases with increasing flow passage (groove) diameter. Increasing the pressure drop of a sensor cell at a given flow rate relative to the remaining cells in the stack will decrease the reactant flow to the sensor cell, in accordance with Darcy's equation. In this regard, the reactant stoichiometry will be lower for the sensor cell relative to the remaining cells in the stack, thereby increasing performance sensitivity to reactant stoichiometry relative to the remaining cells. The flow field channel modification(s) to provide the desired performance sensitivity to reactant stoichiometry must cover the range of conditions (such as, for example, current density and pressure) that the fuel cell will experience during normal operating conditions.

In large stacks containing many individual fuel cells, pressure effects in the manifold due for example to Bernoulli effects or liquid water effects can result in different reactant flow distributions. In this regard, a tendency has been observed, in large fuel cell stacks for heavy-duty vehicles like buses, for the cells furthest from the internal humidifier (that is, the cells furthest from the inlet of the humidified fuel stream) to go into cell reversal because of fuel starvation. It is therefore desirable in such large stacks to incorporate several sensor cells at different locations in the stack (such as, for example, at both ends and in the middle) to account for stack related changes in the cell environment.

It is also desirable to distinguish between stack performance loss due to low oxidant and low fuel stoichiometry in order to initiate the appropriate system response. This may be accomplished by employing more than one sensor cell, for instance employing one sensor cell designed to be more sensitive to oxidant stoichiometry and another sensor cell designed to be more sensitive to fuel stoichiometry. This is best achieved by separating the low oxidant stoichiometry sensor cell from the low fuel stoichiometry sensor cell if cell voltage is being monitored. Although more complicated, a single sensor cell could distinguish between low oxidant stoichiometry and low fuel stoichiometry based upon a characteristic voltage response or based on a monitored cell flow field pressure drop or a perimeter voltage closest to the exit of each flow field. (The voltage at all points on a given electrode or flow field is not constant in a fuel cell under load. Voltage differences may be readily detected, particularly along a reactant flow path in a flow field. The magnitude of these voltage differences within a fuel cell can be indicative of abnormal conditions such as low reactant stoichiometries. Thus a suitable sensor cell may be responsive to voltage drops or voltage distributions within a component of a sensor cell.)

The approaches described above in connection with low stoichiometry sensitive sensor cells can also be applied to other deleterious fuel cell operating conditions, including:

flooding, which can be detected in advance, for example, by a sensor cell similar to the low stoichiometry cell or by changing the MEA or flow field geometry to make it more sensitive to flooding;

dehydration, which can be detected in advance, for example, by a sensor cell with increased reactant flow rate (increased stoichiometry) to amplify the effects of dehydration or by employing a different membrane or electrode which is more sensitive to dehydration;

undesirable operating temperatures, which can be detected in advance, for example, by a sensor cell with a modified coolant flow field plate which exacerbates the temperature change in the sensor cell;

reactant dilution (such as, for example, nitrogen build-up), which can be detected in advance, for example, by the low stoichiometry sensor cell described above and/or an MEA which is more sensitive to mass transport phenomena;

catalyst poisoning, which can be detected in advance, for example, by a sensor cell with a more sensitive catalyst and/or a lower effective catalyst loading.

In preferred embodiments of the latter case, sensor cells have enhanced sensitivity to carbon monoxide poisoning relative to the remaining cells in the stack. Use of such sensor cells may be advantageous in fuel cell systems incorporating a reformer where carbon monoxide impurity is typically present in the reformate stream. Carbon monoxide sensitive sensor cells may be obtained by employing less anode electrocatalyst or a more carbon monoxide sensitive anode electrocatalyst in the sensor cell(s) than other fuel cells in the stack. It is desirable that the catalyst in the sensor cell be robust with respect to carbon monoxide poisoning (so that the sensor cell is not permanently damaged) but that the sensor cell performance be more sensitive to the effect of carbon monoxide.

An air bleed may be used in such systems to mitigate the adverse effects of carbon monoxide present in the reformate stream. (Air bleed refers to the practice of introducing a small amount of oxygen, typically air, into the fuel stream to react with and remove adsorbed carbon monoxide from the surface of the anode electrocatalyst.) An insufficient air bleed level may result in carbon monoxide poisoning and may be detected by a carbon monoxide sensitive sensor cell (which could then trigger an increase in the air bleed level). However, an overly high air bleed level may result in excessive heat generation at the anode and possible degradation. Thus, it may be desirable in such systems to employ sensor cells that are sensitive to poisoning and to temperature, and to use the response of these to control the air bleed level.

Several examples are presented below which illustrate certain aspects of sensor cells suitable for use in gas fed solid polymer electrolyte fuel cells. These should not be construed as limiting in any way. For instance, sensor cells are also suitable for use in liquid feed solid polymer electrolyte fuel cells (for example, as methanol concentration sensors in direct methanol fuel cells).

Figure 4A:
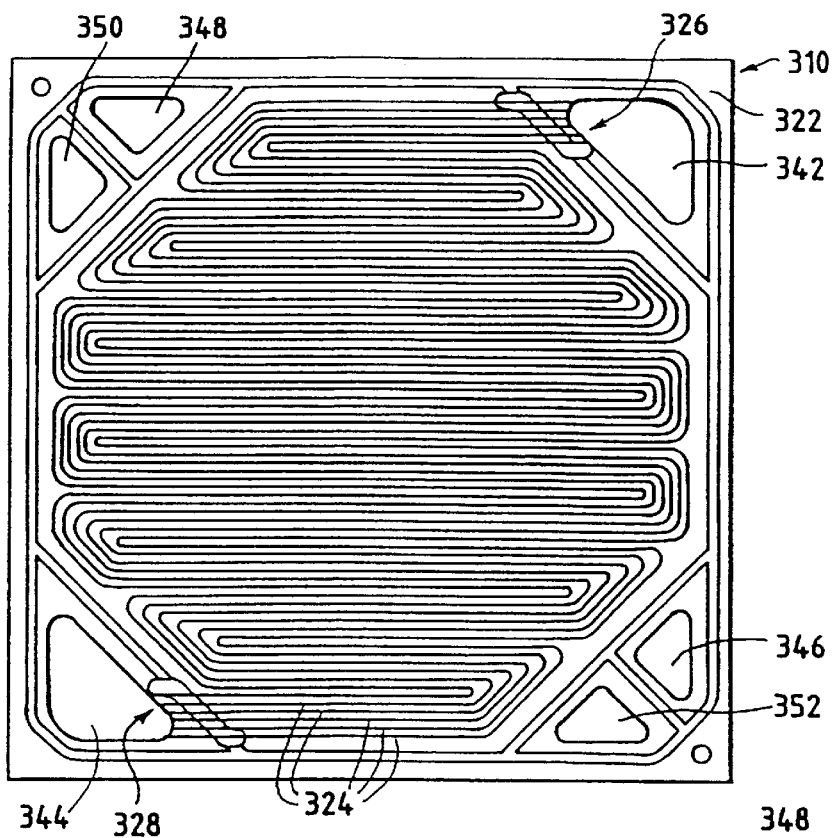
FIGS. 4A and 4B show the oppositely facing surfaces of a bipolar cathode flow field plate for an exemplary low oxidant (air) stoichiometry sensor cell.
Figure 4B:
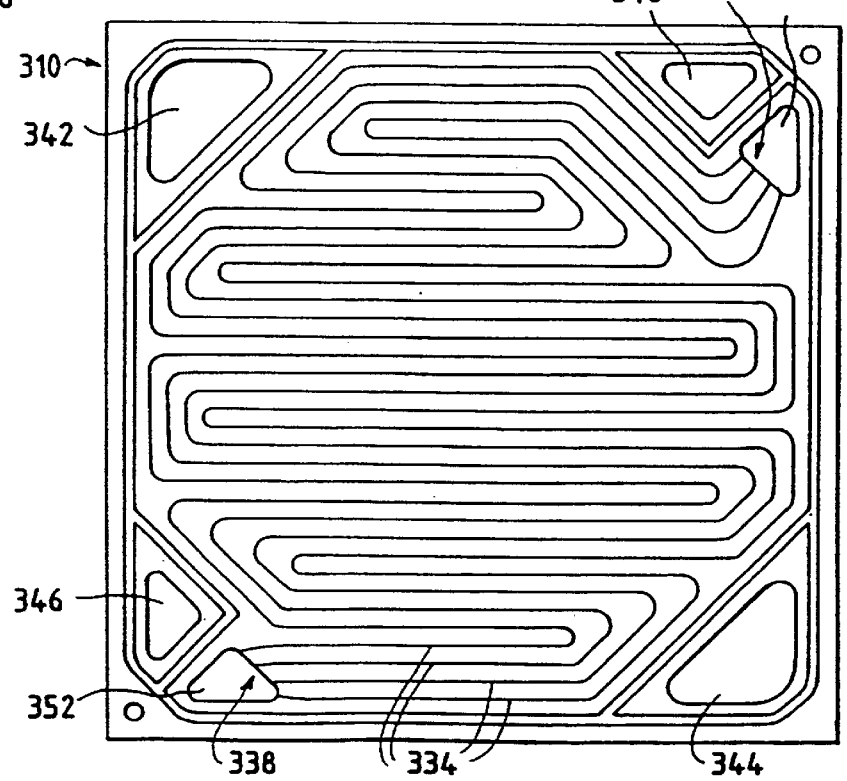

The performance of a low oxidant stoichiometry and low fuel stoichiometry sensor cell has been demonstrated in an 8-cell stack. FIGS. 4A and 4B show the oppositely facing surfaces 322, 332 of a bipolar cathode flow field plate 310 for a low oxidant (air) stoichiometry sensor cell. Surface 322 in FIG. 4A has formed therein six serpentine flow channels or grooves 324 for directing an oxidant stream (preferably air) between an oxidant inlet 326 and oxidant outlet 328. The depth of flow channels 324 in the cathode plate of the sensor cell is less than the depth of the corresponding channels in the cathode plate of each of the remaining seven fuel cells of the stack. The reduced depth of the flow channel 324 in the sensor cell cathode plate induces a pressure drop in the cathode flow field which renders the sensor cell more sensitive to low oxidant stoichiometry, as discussed above with respect to Darcy's equation. Surface 322 contacts the cooperating major planar surface of a membrane electrode assembly (not shown in FIG. 4A).

Surface 332 in FIG. 4B has formed therein four serpentine flow channels or grooves 334 for directing a coolant fluid stream (preferably liquid water) from a coolant inlet 336 to a coolant outlet 338.

As further shown in FIGS. 4A and 4B, cathode flow field plate 310 has formed therein a plurality of manifold openings 342, 344, 346, 348, 350, 352, each of which extends between surfaces 322, 332. Manifold opening 342 directs the incoming, humidified oxidant stream and delivers it to the plurality of fuel cells which make up the stack. Manifold opening 344 receives the exhaust oxidant stream and directs it towards the oxidant exhaust opening of the fuel cell stack. Manifold opening 346 directs the incoming, humidified fuel stream and delivers it to the plurality of fuel cells which make up the stack. Manifold opening 348 receives the exhaust fuel stream and directs it towards the fuel exhaust opening of the fuel cell stack. Manifold opening 350 directs the incoming, coolant stream and delivers it to the coolant jackets associated with the plurality of fuel cells which make up the stack. Manifold opening 352 receives the exhaust coolant stream and directs it towards the coolant exhaust opening of the fuel cell stack. Thus, the cells in the stack are manifolded in parallel from common supply manifold headers to common exhaust manifold headers for each fluid.

Figure 5A:
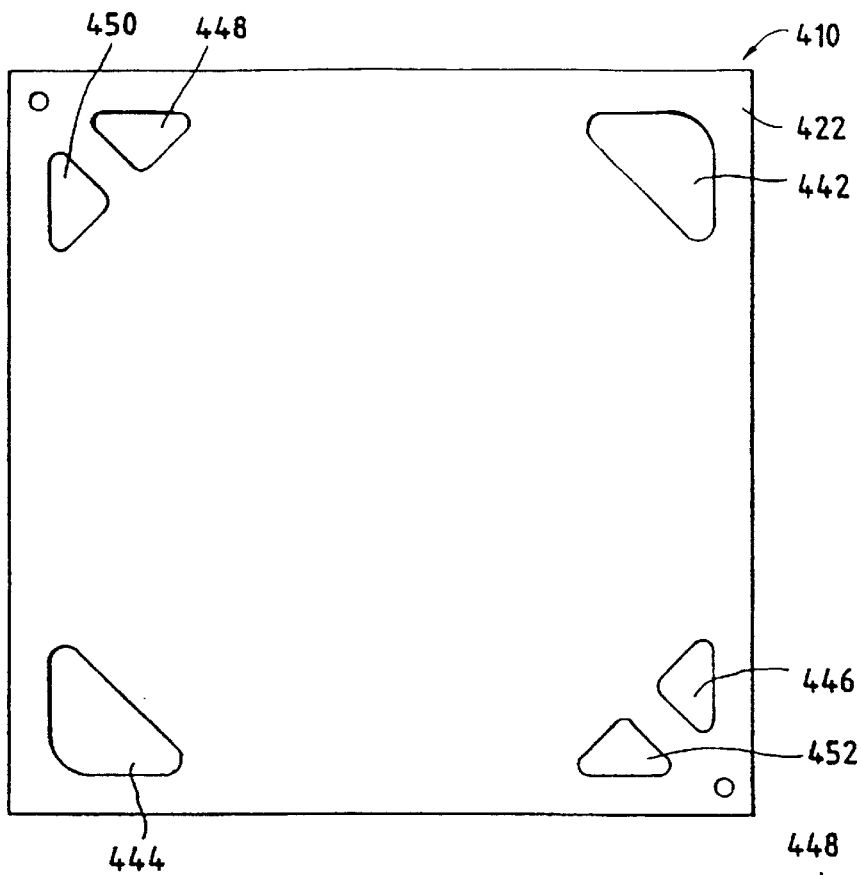
FIGS. 5A and 5B show the oppositely facing surfaces of a bipolar anode flow field plate for an exemplary low fuel ($H_2$) stoichiometry sensor cell.
Figure 5B:
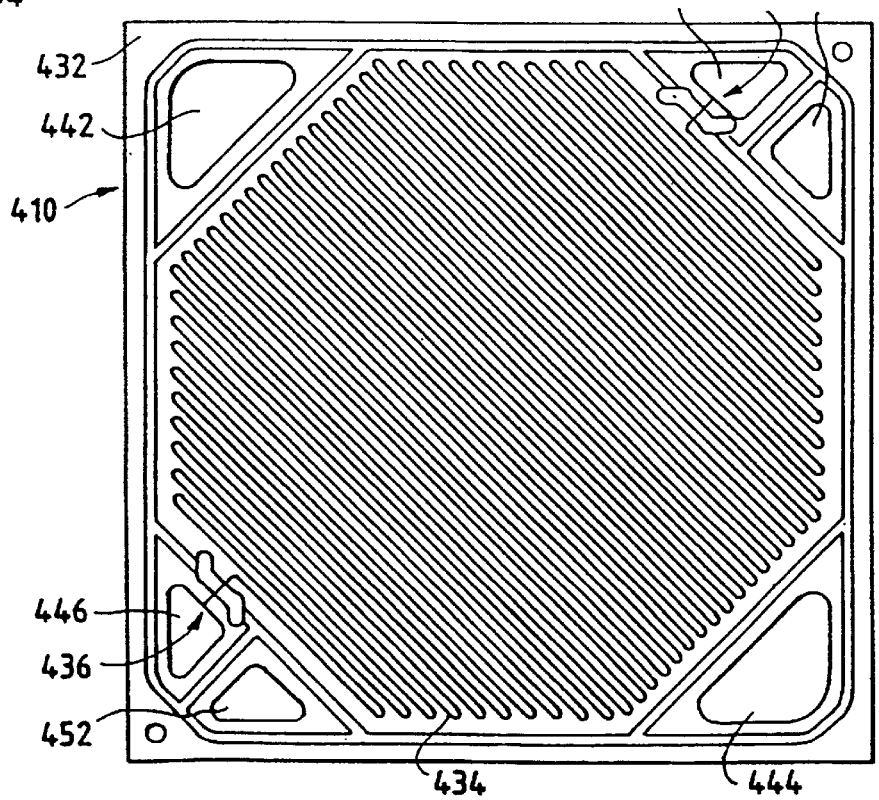

FIGS. 5A and 5B show the oppositely facing surfaces 422, 432 of a bipolar anode flow field plate 410 for a low fuel ($H_2$) stoichiometry sensor cell. Surface 422 is planar (ungrooved), and contacts the cooperating surface 332 shown in FIG. 4B to form a coolant jacket. Surface 432 in FIG. 5B has formed therein one serpentine flow channel or groove 434 for directing a fuel stream (preferably hydrogen) between a fuel inlet 436 and a fuel outlet 438. The depth of flow channel 434 in the anode plate 410 of the sensor cell is less than the depth of the corresponding channels in the anode plate of each of the remaining seven fuel cells of the stack. The reduced depth of the flow channel 434 in the sensor cell anode plate induces a pressure drop in the anode flow field which renders the sensor cell more sensitive to low fuel (hydrogen) stoichiometry. Surface 432 contacts the other major planar surface of the membrane electrode assembly (not shown in FIG. 5B) also contacted on its opposite side by surface 322 shown in FIG. 4A.

As further shown in FIGS. 5A and 5B, anode flow field plate 410 has formed therein a plurality of manifold openings 442, 444, 446, 448, 450, 452, each of which extends between surfaces 422, 432. When cathode plate 310 and anode plate 410 are assembled, manifold openings 442, 444, 446, 448, 450, 452 align with openings 342, 344, 346, 348, 350, 352 to form the manifolds for the incoming and exhaust fuel, oxidant and coolant streams.

Figure 6B:
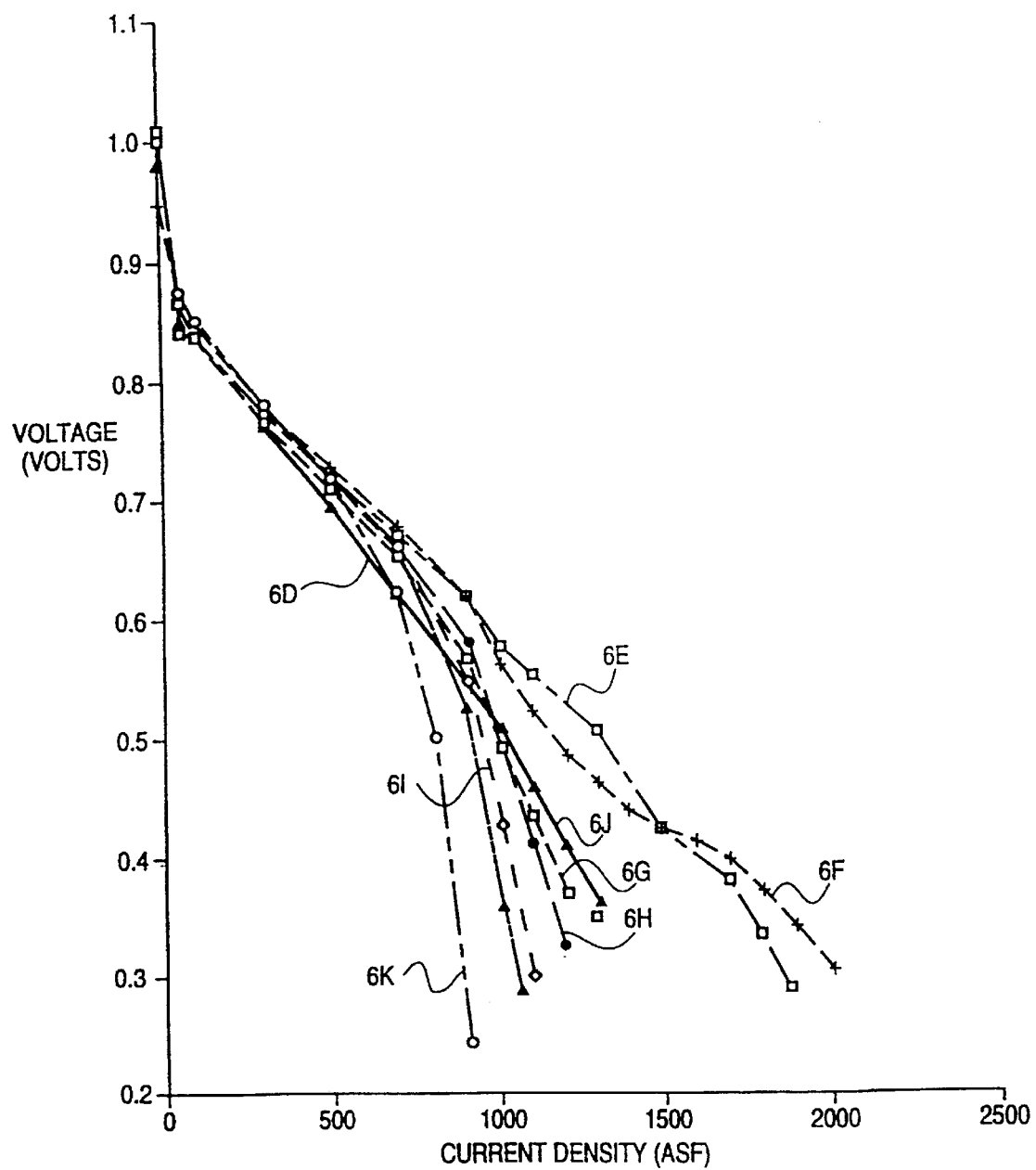
FIG. 6b is a composite polarization plot of cell voltage as a function of current density for eight different air stoichiometries in a fuel cell operated at 2.0 $H_2$ stoichiometry, 30/30 psig air/$H_2$, cell temperature=75° C., active area=0.25 ft$^2$, Dow experimental membrane (trade designation XUS 13204.10), 6% polytetrafluoroethylene in the cathode, 10/2 pass $H_2$/air flow fields.

FIG. 6a is a composite plot showing cell voltage as a function of oxidant (air) stoichiometry of a fuel cell at three different current densities, namely, 100 amperes per square foot (ASF) in plot 6A, 500 ASF in plot 6B and 1000 ASF in plot 6C. FIG. 6b is a composite polarization plot of cell voltage as a function of current density for eight different air stoichiometries in a fuel cell operated at 2.0 $H_2$ stoichiometry, 30/30 psig air/$H_2$, cell temperature=75° C., active area=0.25 ft$^2$, Dow experimental membrane (trade designation XUS 13204.10), 6% polytetrafluoroethylene in the cathode, 10/2 pass $H_2$/air flow fields. FIG. 6b shows the polarization plots at air stoichiometries of 6 (plot 6D), 4 (plot 6E), 3 (plot 6F), 2.5 (plot 6G), 2 (plot 6H), 1.75 (plot 6I), 1.5 (plot 6J), and 1.25 (plot 6K).

FIGS. 6a and 6b show that sensitivity to stoichiometry increases with increased current density. Thus, decreasing the active area of the sensor cell makes the sensor cell more sensitive to stoichiometry changes. A decrease in the active area of both anode and cathode should result in increased sensitivity to stoichiometry changes in either reactant. However, a decrease in the active area of just one of the electrodes may still effectively reduce the active area in the other electrode if much of the area in the latter electrode is physically so far away from the former electrode that there is no practical ionic pathway thereto. Thus, in order to make a sensor cell sensitive to only one reactant stoichiometry, is the active area of one electrode is reduced in such a way that all the active area of the other electrode is still physically close to active areas on the reduced area electrode. This may be accomplished by using an electrode of similar geometric size to the other but which has small inactive regions dispersed throughout (for example, by depositing electrocatalyst on the electrode surface in a series of closely spaced, narrow stripes). As an alternative, the same effect may be simulated by masking the reactant supply side of an electrode in an MEA using a pattern of gas impermeable stripes. Alternatively, for example, in embodiments having multiple channel flow fields, every other channel in a flow field might be blocked. Such techniques can also take advantage of the variation in current density and reactant concentrations which exist over the active electrode area. Thus, non-uniform masking patterns or catalyst deposition might desirably be employed.

Figure 7A:
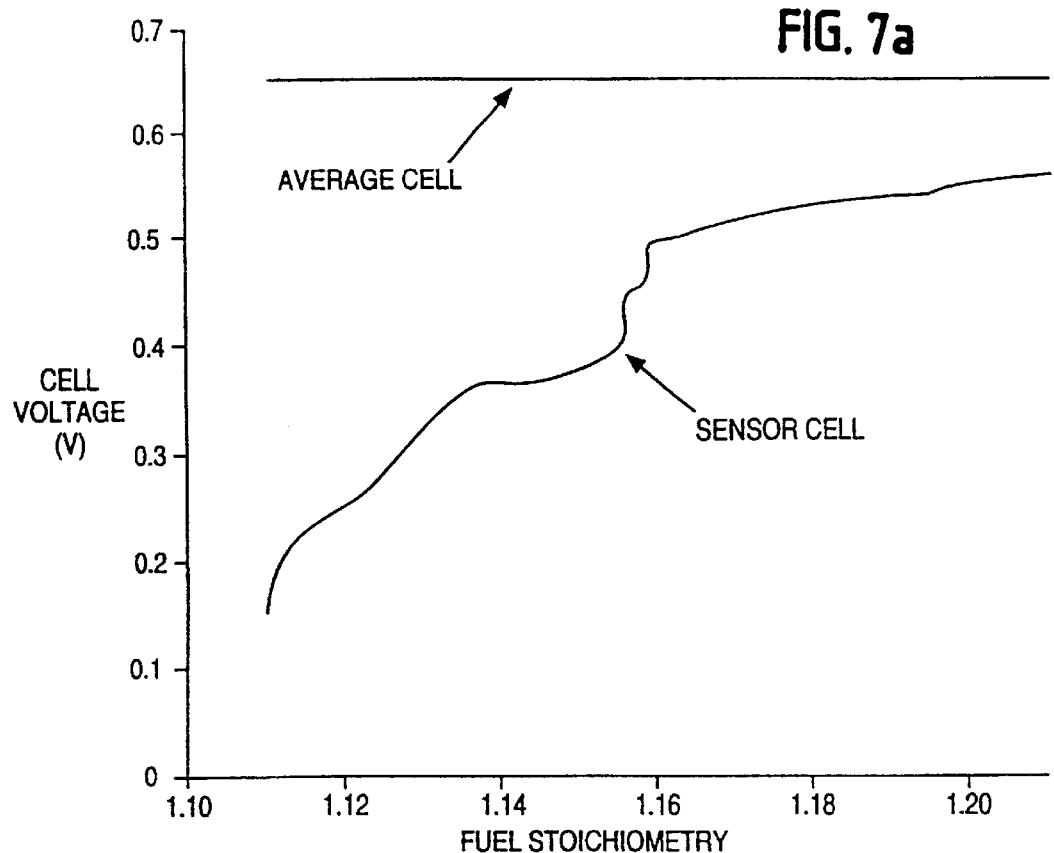
FIG. 7a shows a plot of cell voltage as a function of fuel stoichiometry for the average cell in a fuel cell stack and a sensor cell in the same stack. The sensor cell has been masked to simulate a reduction of about 40% in active area of the anode.

FIG. 7a shows a plot of cell voltage as a function of fuel stoichiometry for the sensor cell and for the average of the remaining cells in the same stack. The sensor cell was similar in construction to the other cells in the stack except that it had a simulated reduction of about 40% in active area of the anode that was achieved by masking the fuel supply side of the MEA with a series of gas impermeable stripes. (The stripe distribution was non-linear in that the stripes were wider and more closely spaced near the fuel inlet.) As shown in FIG. 7a, the sensor cell was significantly more sensitive to reduced fuel stoichiometry than the average cell. The is sensitivity of the sensor cell to reduced oxidant stoichiometry was not significantly different from that of the average cell.

Figure 7B:
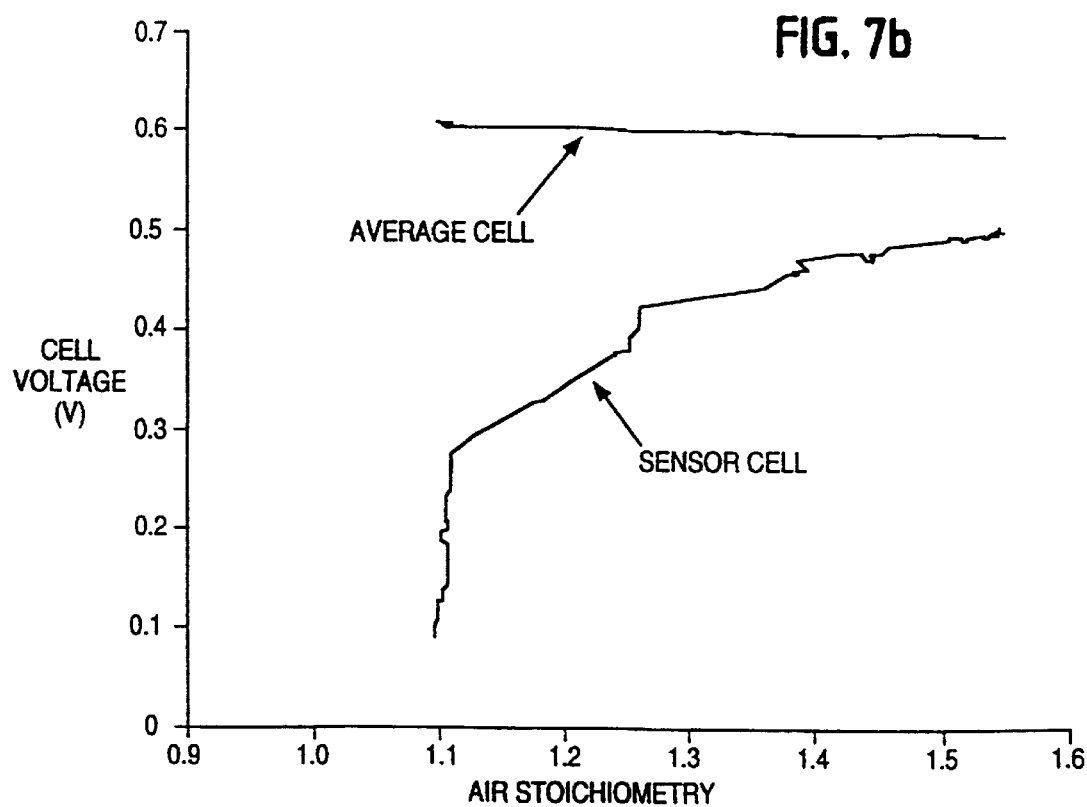
FIG. 7b shows a plot of cell voltage as a function of oxidant stoichiometry for the average cell in a fuel cell stack and a sensor cell in the same stack. Certain channels in the oxidant flow field in the sensor cell were blocked to simulate a reduction of about 20% in active area of the cathode.

FIG. 7b shows a plot of cell voltage as a function of oxidant stoichiometry for the sensor cell and for the average of the remaining cells in the same stack. The sensor cell was similar in construction to the other cells in the stack except that it had a simulated reduction of about 20% in active area of the cathode that was achieved by blocking channels in a multiple, linear channel oxidant flow field. As shown in FIG. 7b, the sensor cell was significantly more sensitive to reduced oxidant stoichiometry than the average cell. The sensitivity of the sensor cell to reduced fuel stoichiometry was not significantly different from that of the average cell. Blocking flow channels has been found to be effective for preparing sensor cells that are sensitive to a single reactant stoichiometry over a wide range of current densities where the reactant is either fuel or oxidant. The masking technique has also been effective where the reactant is fuel, but has not been so effective over as wide a range of current densities where the reactant is oxidant.

FIG. 8 is a composite plot showing cell voltage as a function of oxidant (air) stoichiometry at 100 amperes per square foot (ASF), at three different oxidant stream pressures, in a sensor cell (identified as cell 8) and in the average of the other seven cells of the stack. Plot 8A shows cell voltage as a function of air stoichiometry for the average of the seven cells at 100 ASF and 10 psig. Plot 8B shows cell voltage as a function of air stoichiometry for a sensor cell 8 having the cathode plate illustrated in FIG. 4A, at 100 ASF and 10 psig. Plot 8C shows cell voltage as a function of air stoichiometry for the average of the seven cells at 100 ASF and 30 psig. Plot 8D shows cell voltage as a function of air stoichiometry for the sensor cell at 100 ASF and 30 psig. Plot BE shows cell voltage as a function of air stoichiometry for the average of the seven cells at 100 ASF and 65 psig. Plot 8F shows cell voltage as a function of air stoichiometry for the sensor cell at 100 ASF and 65 psig. FIG. 8 shows that the cell voltage of the sensor cell decreases dramatically in response to decreased air stoichiometry, in comparison to the corresponding voltage drop in the average of the other seven fuel cells in the stack. FIG. 8 also shows that the voltage drop in the sensor cell is triggered by higher air stoichiometries at higher pressure levels. By varying the flow field design, the air stoichiometry that triggers the voltage drop can be adjusted based upon the expected range of operating conditions.

Figure 9:
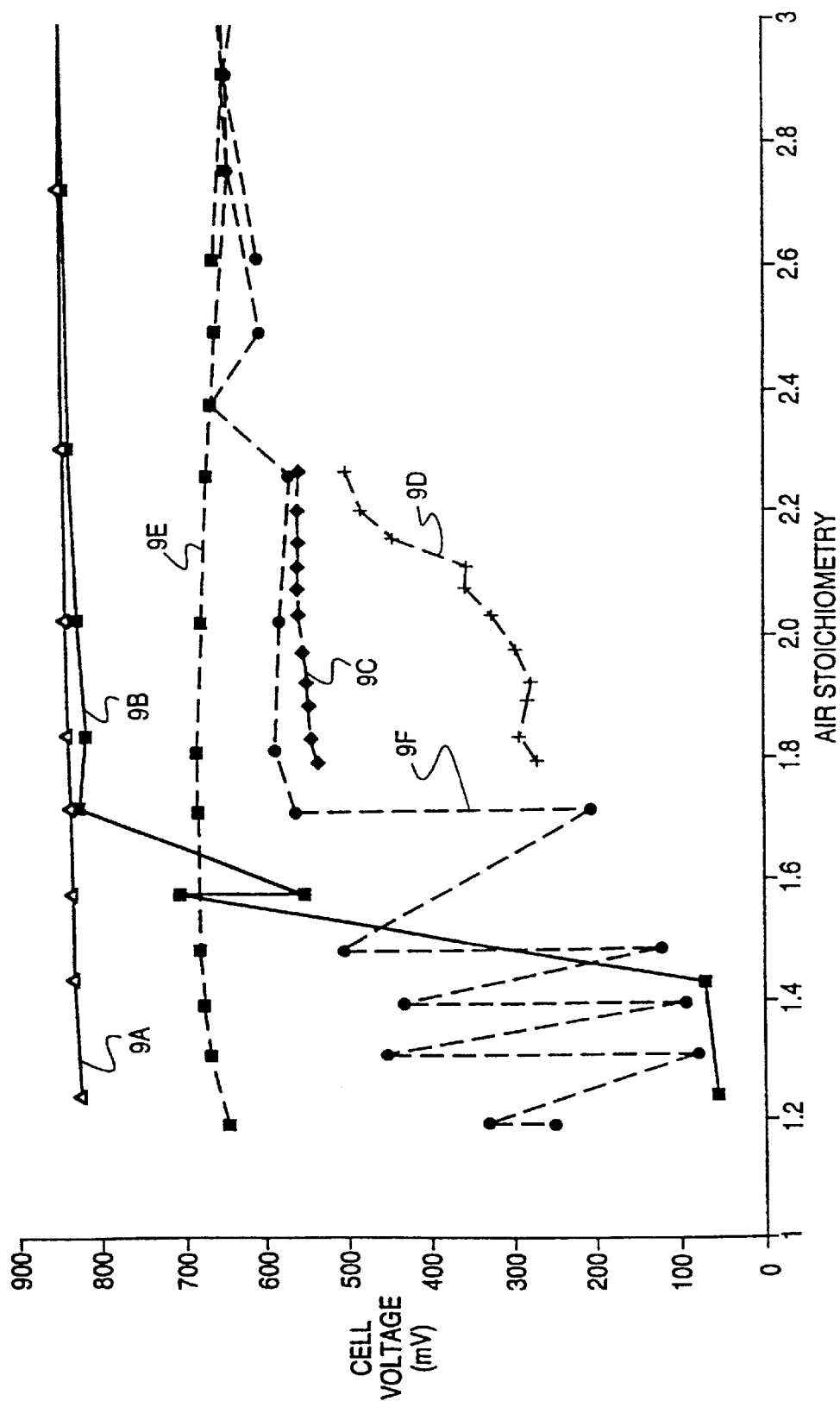
FIG. 9 is a composite plot showing cell voltage as a function of oxidant (air) stoichiometry at 30 psig, at three different current densities, in a sensor cell (cell 8) and in the average of the other seven cells of the stack.
Figure 10:
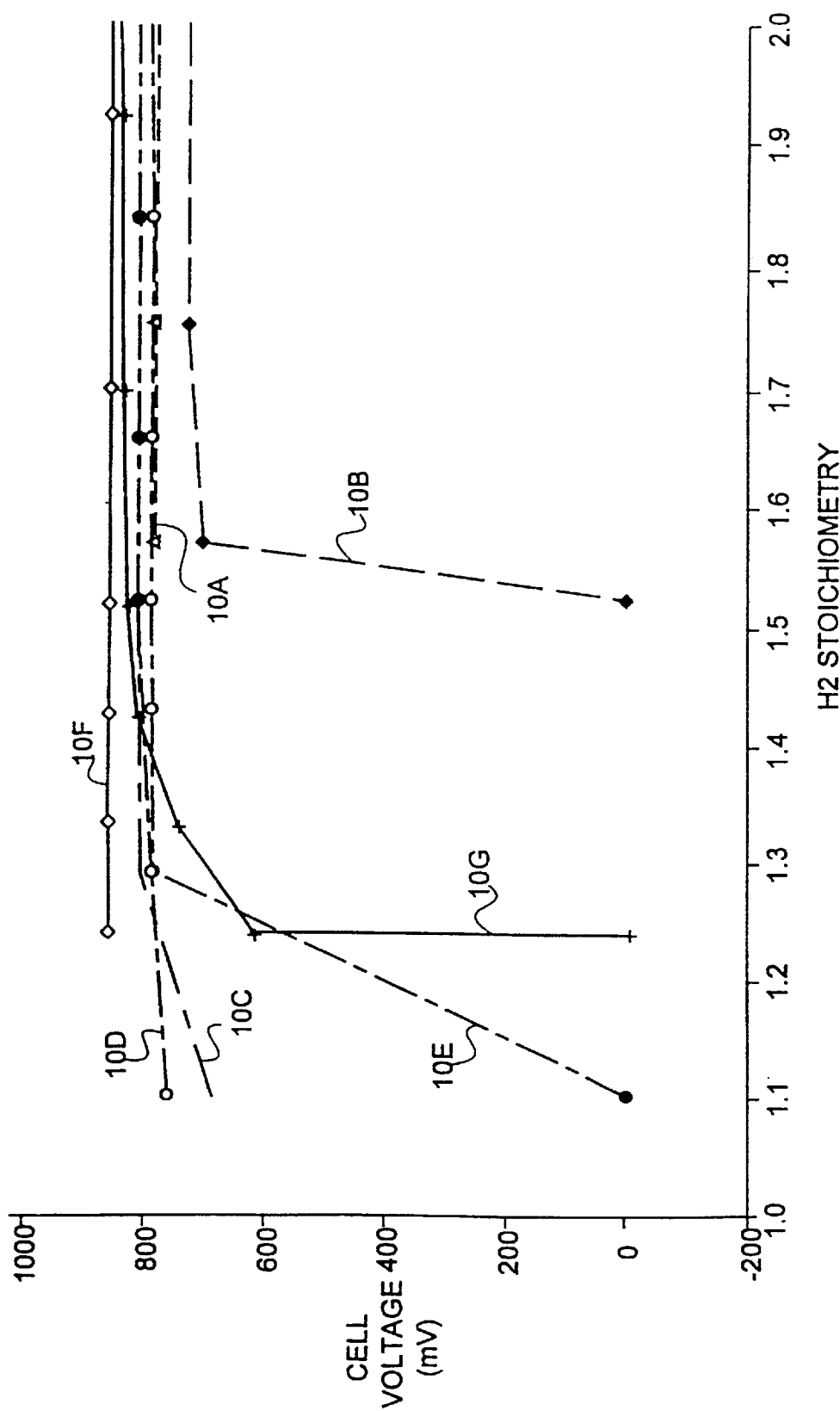
FIG. 10 is a composite plot showing cell voltage as a function of $H_2$ stoichiometry at 100 ASF, at three different fuel ($H_2/N_2$) stream pressures, in a sensor cell (cell 8), in an adjoining cell (cell 7), and in the average of the seven cells of the stack which are not sensor cells.

FIG. 9 is a composite plot showing cell voltage as a function of oxidant (air) stoichiometry at 30 psig, at three different current densities, in a sensor cell (cell 8) and in the average of the other seven cells of the stack. Plot 9A shows cell voltage as a function of air stoichiometry for the average of the seven cells at 100 ASF. Plot 9B shows cell voltage as a function of air stoichiometry for a sensor cell having the cathode plate illustrated in FIG. 4A, at 100 ASF. Plot 9C shows cell voltage as a function of air stoichiometry for the average of the seven cells at 1000 ASF. Plot 9D shows cell voltage as a function of air stoichiometry for the sensor cell at 1000 ASF. Plot 9E shows cell voltage as a function of air stoichiometry for the average of the seven cells at 600 ASF. Plot 9F shows cell voltage as a function of air stoichiometry for the sensor cell at 600 ASF. FIG. 9 shows that the cell voltage of the sensor cell decreases dramatically in response to decreased air stoichiometry, in comparison to the corresponding voltage drop in the average of the remaining seven fuel cells in the stack. FIG. 9 also shows that the voltage drop in the sensor cell is triggered by higher air stoichiometries at higher current densities. Once again, the air stoichiometry that triggers the voltage drop can be adjusted based upon the expected range of operating conditions FIG. 10 is a composite plot showing cell voltage as a function of $H_2$ stoichiometry at 100 ASF, at three different fuel ($H_2/N_2$) stream. pressures, in a sensor cell (cell 8), in an adjoining cell (cell 7), and in the average of the other seven cells of the stack. Plot 10A shows cell voltage as a function of $H_2$ stoichiometry for the average of the seven cells at 10 psig. Plot 10B shows cell voltage as a function of $H_2$ stoichiometry for a sensor cell having the anode plate illustrated in FIGS. 5A and. 5B, at 10 psig. Plot 10C shows cell voltage as a function of $H_2$ stoichiometry for the average of the seven cells at 30 psig. Plot 10D shows cell voltage as a function of $H_2$ stoichiometry for adjoining cell 7 at 100 ASF and 30 psig. Plot 10E shows cell voltage as a function of $H_2$ stoichiometry for the sensor cell at 30 psig. Plot 10F shows cell voltage as a function of $H_2$ stoichiometry for the average of the seven cells at 65 psig. Plot 10G shows cell voltage as a function of $H_2$ stoichiometry for the sensor cell at 65 psig. FIG. 10 shows that the cell voltage of the sensor cell decreases dramatically in response to decreased $H_2$ stoichiometry, in comparison to the corresponding voltage drop in the average of the other seven fuel cells in the stack.

Figure 11:
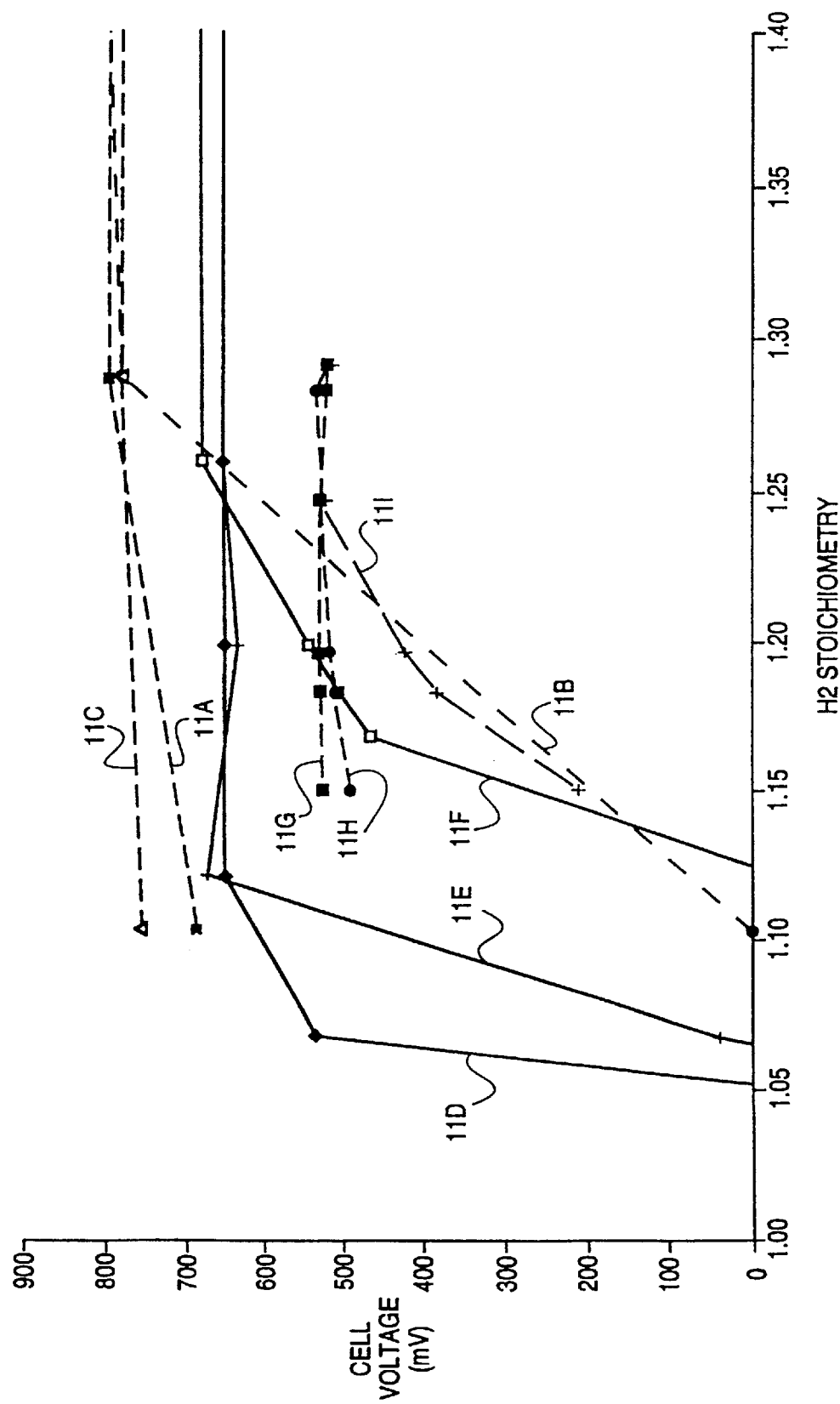
FIG. 11 is a composite plot showing cell voltage as a function of $H_2$ stoichiometry at 30 psig, at three different current densities, in a sensor cell (cell 7), in the adjoining end cell (cell 8) and in the average of the seven cells of the stack which are not sensor cells.

FIG. 11 is a composite plot showing cell voltage as a function of $H_2$ stoichiometry at 30 psig, at three different current densities, in a sensor cell (identified this time as cell 7), in the adjoining end cell (identified as cell 8) and in the average of the eight cells of the stack. The fuel stream contained 18% $N_2$ and 82% $H_2$. Plot 11A shows cell voltage as a function of air stoichiometry for the average of the eight cells at 100 ASF. Plot 11B shows cell voltage as a function of air stoichiometry for sensor cell 7 at 100 ASF. Plot 11C shows cell voltage as a function of air stoichiometry for adjoining end cell 8 having the anode plate illustrated in FIG. 5B, at 100 ASF. Plot 11D shows cell voltage as a function of air stoichiometry for the average of the eight cells at 600 ASF. Plot 11E shows cell voltage as a function of air stoichiometry for sensor cell 7 at 600 ASF. Plot 11F shows cell voltage as a function of air stoichiometry for adjoining end cell 8 at 600 ASF. Plot 11G shows cell voltage as a function of air stoichiometry for the average of the eight cells at 1000 ASF. Plot 11H shows cell voltage as a function of air stoichiometry for sensor cell 7 at 1000 ASF. Plot 11I shows cell voltage as a function of air stoichiometry for adjoining end cell 8 at 1000 ASF. FIG. 11 shows that the cell voltage of the sensor cell decreases dramatically in response to decreased $H_2$ stoichiometry, in comparison to the corresponding voltage drop in the adjoining cell 7 and in the average of the eight fuel cells in the stack. FIG. 11 also shows that the voltage drop in the sensor cell is triggered by lower $H_2$ stoichiometries at higher current densities.

Figure 12:
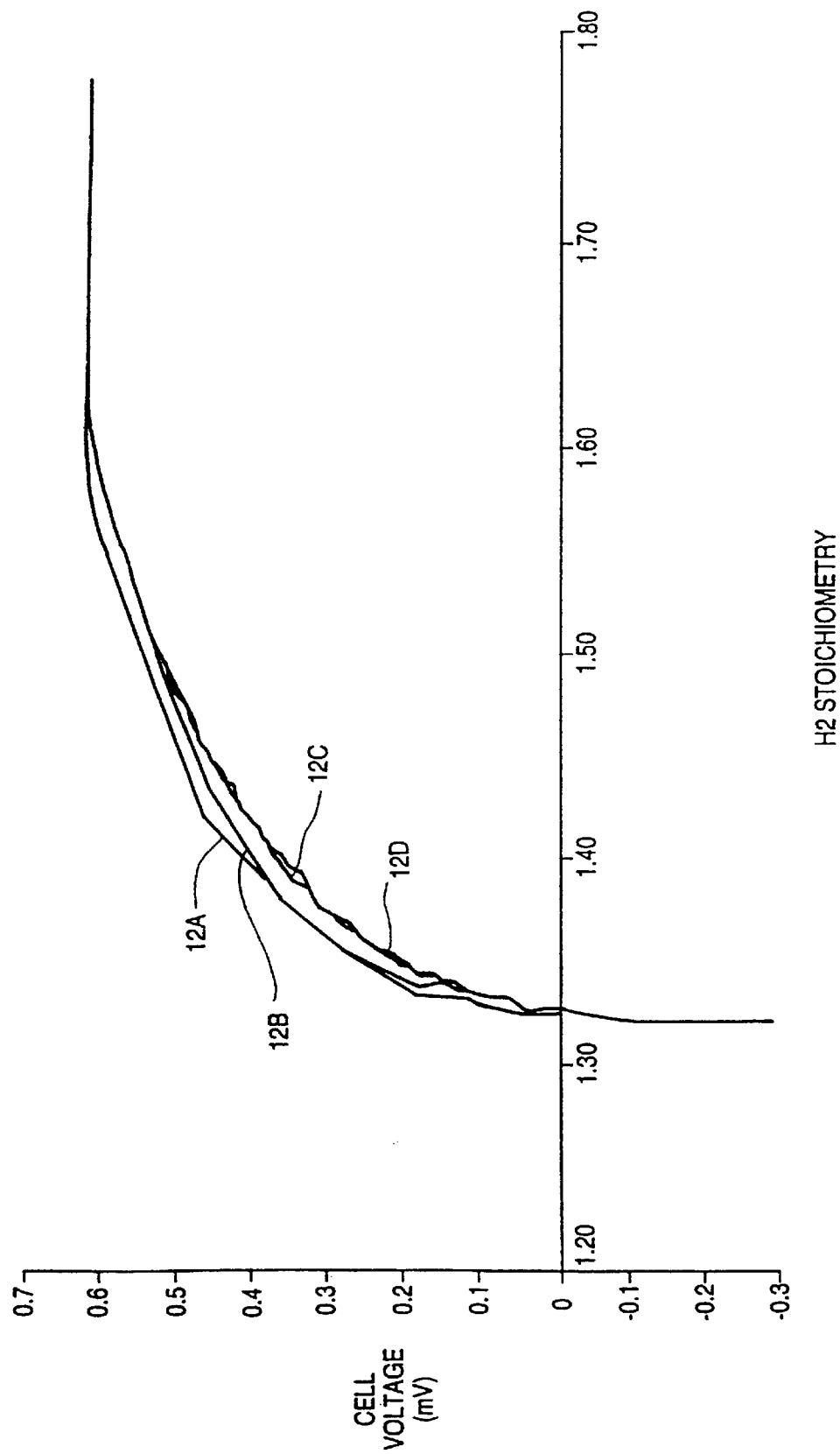
FIG. 12 shows a composite plot of cell voltage as a function of $H_2$ stoichiometry at 600 ASF and 30 psig for each of the eight cells of the stack, including sensor cell 8.

FIG. 12 shows a composite plot of cell voltage as a function of $H_2$ stoichiometry at 600 ASF and 30 psig for each of the eight cells of the stack,.including sensor cell 8. Plots 12A and 12B show the voltage drop curve for two runs of sensor cell 8 in which the $H_2$ flow rate was decreased slowly. Plots 12C and 12D show the voltage drop curve for two runs of sensor cell 8 in which the $H_2$ flow rate was decreased significantly faster than in plots 12A and 12B (the time lapse between data points was the same in all the plots). FIG. 12 shows that the voltage drop of sensor cell 8 occurs without regard to the speed with which the $H_2$ flow rate is decreased.

The present sensor cell technique may provide one or more of the following advantages over conventional fuel cell performance monitoring techniques:

(1) Sensor cells can be designed to detect specific undesirable operating conditions encountered by fuel cell stacks in a system.

(2) Sensor cells can detect undesirable operating conditions in advance of the other cells in the fuel cell stack and may be used to trigger a corrective action thereby avoiding general stack cell damage and/or loss of power or fuel cell performance.

(3) Sensor cells can reduce the amount and complexity of cell monitoring and simplify the control system.

(4) Sensor cells may function as productive power-producing fuel cells in the absence of undesirable operating conditions, which may trigger an early drop in their power output.

(5) Sensor cells may be used to provide improved stack safety, lifetime and reliability by triggering corrective actions to protect the remainder of the stack cells from deleterious conditions.

(6) Sensor cells may be designed to be more tolerant or robust to the consequences of the undesirable operating conditions they are detecting, such as, for example, cell reversal and its detrimental effects.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. In an electrochemical fuel cell stack comprising a plurality of fuel cells, each of said fuel cells comprising an anode comprising an anode electrocatalyst, a cathode comprising a cathode electrocatalyst, and an ion exchange membrane interposed between said anode and said cathode, the improvement comprising:

at least one of said plurality of fuel cells being a sensor cell having at least one structural dissimilarity with respect to the remaining fuel cells of said plurality, wherein during operation of said stack, said structural dissimilarity induces at least one of an electrical and thermal process in said sensor cell which is not simultaneously induced in said remaining fuel cells under substantially the same operating conditions; and wherein during operation of said stack, said sensor cell and at least one of said remaining cells are connected to a comparator for comparing said electrical or thermal response of said sensor cell with that of said at least one of said remaining cells.

2. The improved fuel cell stack of claim 1, wherein, during operation of said stack, each of said anodes has a fuel stream directed thereto along an anode flow field, each of said cathodes has an oxidant stream directed thereto along a cathode flow field, each of said fuel stream and said oxidant stream have an inlet pressure and a stoichiometry associated therewith, and each of said plurality of fuel cells generate an electric current per cathode unit area, product water at said cathode and heat at a nominal operating temperature, and wherein said structural dissimilarity induces at least one of an electrical and thermal response in said sensor cell which is not simultaneously induced in said remaining fuel cells under substantially the same operating conditions of fuel and oxidant stream inlet pressure and stoichiometry.

3. The improved fuel cell stack of claim 1 wherein, during operation of said stack, said sensor cell and said remaining cells provide electrical power.

4. The improved fuel cell stack of claim 1 wherein during operation of said stack a variable electrical load is applied across said fuel cell stack comprising said sensor cell.

5. The improved fuel cell stack of claim 1 wherein said plurality of fuel cells are manifolded to be supplied with reactants in a parallel supply configuration.

6. The improved fuel cell stack of claim 1 wherein said at least one response is a voltage change in said sensor cell.

7. The improved fuel cell stack of claim 1 wherein said at least one response is a change in electric current per cathode unit area in said sensor cell.

8. The improved fuel cell stack of claim 1 wherein said at least one response is a change in the voltage distribution within a component of said sensor cell.

9. The improved fuel cell stack of claim 1 wherein said at least one response is a change in electrical resistance in said sensor cell.

10. The improved fuel cell stack of claim 1 wherein said at least one response is a temperature change in said sensor cell.

11. The improved fuel cell stack of claim 1 wherein said structural dissimilarity comprises at least one of said anode and said cathode in said sensor cell having an electrochemically active area less than the electrochemically active areas of said remaining fuel cells.

12. The improved fuel cell stack of claim 1 wherein reactant access to at least one of said anode and cathode electrocatalysts in said sensor cell is impeded relative to in said remaining fuel cells.

13. The improved fuel cell stack of claim 1 wherein said structural dissimilarity comprises at least one of said anode and said cathode in said sensor cell having an electrocatalyst loading less than the electrocatalyst loading in said remaining fuel cells.

14. The improved fuel cell stack of claim 1 wherein said structural dissimilarity comprises a sensor cell anode flow field configuration which differs from the anode flow field configuration of said remaining said fuel cells.

15. The improved fuel cell stack of claim 14 wherein said sensor cell anode flow field configuration induces a pressure drop which is greater than the pressure drop induced in the anode flow field configuration of said remaining fuel cells.

16. The improved fuel cell stack of claim 1 wherein said structural dissimilarity renders comprises a sensor cell cathode flow field configuration which differs from the cathode flow field configuration of said remaining fuel cells.

17. The improved fuel cell stack of claim 16 wherein said sensor cell cathode flow field configuration induces a pressure drop along said flow field which is greater than the corresponding pressure drop induced in the cathode flow field configuration of said remaining fuel cells.

18. The improved fuel cell stack of claim 1 wherein the anode electrocatalyst in said sensor cell differs in composition from the anode electrocatalyst in said remaining fuel cells.

19. The improved fuel cell stack of claim 1 wherein the cathode electrocatalyst in said sensor cell differs in composition from the cathode electrocatalyst in said remaining fuel cells.

20. The improved fuel cell stack of claim 1 wherein each of said fuel cells has a coolant stream directed along the coolant flow field in thermal communication with said each of said fuel cells and wherein said structural dissimilarity comprises a sensor cell coolant flow field configuration which differs from the coolant flow field configuration of said remaining fuel cells.

21. The improved fuel cell stack of claim 1 wherein said structural dissimilarity renders said sensor cell more sensitive to fuel stoichiometry.

22. The improved fuel cell stack of claim 1 wherein said structural dissimilarity renders said sensor cell more sensitive to oxidant stoichiometry.

23. The improved fuel cell stack of claim 1 wherein said structural dissimilarity renders said sensor cell more sensitive to carbon monoxide poisoning.

24. The improved fuel cell stack of claim 1 wherein said structural dissimilarity renders said sensor cell more sensitive to air bleed level in said fuel stream.

25. The improved fuel cell stack of claim 1 wherein said structural dissimilarity renders said sensor cell more sensitive to operating temperature.

26. The improved fuel cell stack of claim 1 wherein said structural dissimilarity renders said sensor cell more sensitive to methanol poisoning.

27. The improved fuel cell stack of claim 1 wherein said fuel cell stack is a direct methanol fuel cell stack, and wherein said structural dissimilarity renders said sensor cell more sensitive to methanol concentration.

28. The improved fuel cell stack of claim 1 wherein said structural dissimilarity renders said sensor cell more sensitive to flooding.

29. The improved fuel cell stack of claim 1 wherein said structural dissimilarity renders said sensor cell more sensitive to dehydration.

30. The improved fuel cell stack of claim 1 wherein said structural dissimilarity renders said sensor cell more sensitive to mass transport phenomena.

31. A method of operating an electrochemical fuel cell stack comprising a fuel cell stack comprising a plurality of solid polymer fuel cells, at least one of said plurality of fuel cells being a sensor cell having at least one structural dissimilarity with respect to the remaining fuel cells of said plurality wherein, during operation of said stack, said structural dissimilarity induces at least one of an electrical and thermal response in said sensor cell which is not simultaneously induced in said remaining fuel cells under substantially the same operating conditions, said method comprising:

monitoring at least one of an electrical and thermal operating parameter of said sensor cell and the same parameter of at least one of said remaining cells;

comparing said monitored operating parameter of said sensor cell with that of said at least one remaining cell;

generating an output signal if said compared parameters differ by more than a predetermined threshold amount indicative of an undesirable operating condition.

32. The method of claim 31 wherein said monitored parameter is cell voltage.

33. The method of claim 31 wherein said monitored parameter is temperature.

34. The method of claim 31 wherein said monitored parameter is the rate of change of cell voltage.

35. The method of claim 31 wherein said output signal comprises issues a warning signal to alert the operator of said system.

36. The method of claim 31 wherein said output signal comprises recording said monitored parameters.

37. The method of claim 31 wherein said output signal initiates a corrective action to restore desirable operating conditions in said system.

38. The method of claim 31 wherein said monitoring is done continuously during operation of said stack.

39. The method of claim 31 wherein said monitoring is done periodically during operation of said stack.

* * * * *

UNITED STATES PATENT AND TRADEMARK OFFICE
CERTIFICATE OF CORRECTION

PATENT NO. : 6,673,480 B1
DATED : January 6, 2004
INVENTOR(S) : David P. Wilkinson, Shanna D. Knights and Michael V. Lauritzen It is certified that error appears in the above-identified patent and that said Letters Patent is hereby corrected as shown below:

Column 14,
Line 56, replace "thermal process" with -- thermal response --.

Column 15,
Line 62, after "dissimilarity" and before "comprises", delete "renders".

Signed and Sealed this

Seventeenth Day of August, 2004

JON W. DUDAS
*Acting Director of the United States Patent and Trademark Office*